US005529812A

United States Patent [19]

Keding

[11] Patent Number: 5,529,812

[45] Date of Patent: Jun. 25, 1996

[54] METHOD OF ELECTRON-BEAM CURING OF VARNISHED BOARD

[76] Inventor: Djörn Keding, "Rosa Maris", 29 Ave. dés Papalins, Fontvieille, MC 98000, Monaco

[21] Appl. No.: 392,772

[22] PCT Filed: Aug. 19, 1993

[86] PCT No.: PCT/SE93/00691

§ 371 Date: Feb. 21, 1995

§ 102(e) Date: Feb. 21, 1995

[87] PCT Pub. No.: WO94/05433

PCT Pub. Date: Mar. 17, 1994

[30] Foreign Application Priority Data

Aug. 27, 1992 [SE] Sweden .................................. 9202470

[51] Int. Cl.$^{6}$ ........................................ C08F 2/46

[52] U.S. Cl. .................. 427/496; 156/273.5; 156/275.5; 427/264; 427/270; 427/278; 427/359; 427/369; 427/385.5; 427/393; 427/397; 427/408; 427/494; 427/504; 427/551; 427/552

[58] Field of Search .................................... 427/496, 504, 427/551, 552, 261, 385.5, 408, 494, 264, 270, 278, 359, 393, 397, 552; 156/273.5, 275.5

*Primary Examiner*—Bernard Pianalto

*Attorney, Agent, or Firm*—Dvorak and Traub

[57] ABSTRACT

The present invention concerns a method of manufacturing decorative board meeting exceptionally high standard concerning abrasion resistance, scratch resistance and impact resistance and which for this pruposes is varnished, electron-beam cured to 60–9.5%, is subjected to a pressing treatment and finally it is electron-beam cured to 100% to provide the disired abrasion resistance, gloss, and surface finish.

3 Claims, No Drawings

METHOD OF ELECTRON-BEAM CURING OF VARNISHED BOARD

The subject invention concerns a method of electron-beam curing varnish that is applied on boards having a decorative surface. The method consists of curing a final (and possibly single) layer of varnish in a two-step procedure with an intermediate pressing step. The curing in the first EB-curing apparatus is intentionally incomplete (to 60–95%) in order to allow the technique chosen for the pressing step to shape the surface of the varnish as desired.

Different surface finish effects (varnish texture and gloss intensity) could be obtained by using differently configured press plates and also by varying the force of the pressure applied. Immediately following the pressing step curing to 100% is effected in the second EB-curing apparatus. The technique is particularly well suited for the manufacture of decorative board material that need to meet exceptionally high requirements as to abrasion resistance, scratch resistance and impact resistance.

High-pressure laminate is a decorative surfacing material that is appreciated for its excellent properties such as e.g. abrasion resistance, impact resistance, scratch resistance, appearance, light resistance, resistance to burns.

The manufacture of high-pressure laminates is effected by bonding together a number of phenol or melamine resin impregnated paper sheets by subjecting them to high pressures and high temperatures. The resulting product is an organic material with inherent stress, which consequently reacts strongly to changes in temperature and the contents of humidity in the air. Even chipboard having a thickness of 40 mm need to be provided with some kind of backing material in order to counter-act the stress exerted by the high-pressure laminate.

In case of thinner applications the stress counter-action is even harder to achieve. A particularly demanding application in this respect is laminated flooring materials having a thickness of 7 mm. In addition, the requirements on abrasion resistance are higher in this case, a problem which is solved by providing the laminates with overlay (an abrasive-resistant coating of cellulose material which is impregnated with melamine and which becomes transparent in the lamination process), reinforced by aluminium oxide particles. The higher the amount of aluminium oxide, the higher the abrasion resistance. However, the amount of aluminium oxide also affects the transparency of the material, and it imparts a greyish appearance to the material which detracts from the aesthetic design of the product. In addition, the aluminium particles have an abrasive effect on the tools in the application stage with resulting increase of the costs in this stage and lower productivity. The following description will show the limitations occurring when high-pressure laminates are to be used in positions where extremely high abrasive resistance is required.

Attempts have been made to replace the expensive high-pressure laminates by other decorative surfacing materials but either the impact resistance or the abrasion resistance has been found to be too low or else both these characteristics have deteriorated to an unacceptable degree. Also the resistance to burns is often lost when the high-pressure laminate is replaced by alternative surfacing materials.

The technique of using electron-beam cured varnish has been known for about 15 years. So far, the technique has been put to practical use in a very limited number of applications. In all, five applications are mentioned in the article 'Decorative particle board surfaces via the UV/EB curing process—15 years of success' in the publication Betagamma, No. 2/88, which is an international periodical on electron and gamma radiation, St. Gallen, Switzerland. It appears that the technique can be used only on flat surfaces and in addition it requires large-series production of articles for which the properties of electron-beam cured varnish are appreciated.

An article in No. 6/89 in the German trade journal I-Lacke, Lacke, written by Wilhelm Baulmann, ICI Lacke Farben, Hilden, Germany makes it irrefutably clear that the properties of EB-cured varnish surfaces perfectly match those of high-pressure laminates.

By using the manufacturing method described in the following of EB-cured varnished decorative layered materials board structures are obtained that are able to meet exceptionally high requirements as regards such properties as abrasion resistance, scratch resistance and impact resistance. In addition, the decorative properties of these varnished surfaces are superior to those of high-pressure laminates.

The polymerization of glue as well as of varnish by means of electron-beam radiation makes possible the use of entirely, solventless products. Applications including EB-cured varnish surfaces in most cases lead to considerable environmental improvements compared with alternative surfacing materials (PVC, high-pressure laminates, other varnishing systems, etcetera) Therefore, the development of efficient production methods with a view to facilitating the utilization of the expensive curing technology involving the use of electronic beams is of great public interest.

The subject invention concerns a method of manufacturing varnished board by electron-beam curing the varnished layer—in case of several varnish layers, the uppermost one—in a two-step process. In the first step the varnish layer is cured to between 60 and 95% whereas in the second step the curing is complete, i.e. 100%. The surface finish of the material is obtained in a pressing process carried out between the two curing steps.

It is essential that the curing in the first step of the curing process is carried out to a degree ensuring a varnish surface which is neither too soft, nor too hard considering the subsequent impression step. A surface that is too soft may be inclined to adhere to the press plate and a surface that is over-cured will be difficult to impress and also tends to crack if elevated pressure forces will be used.

The gloss of the surface is affected by these pressure forces and consequently the possibilites to modify the entire surface finish in the pressing process are favourable, provided that the curing in the first curing process step has been carried out to an adequate degree.

Because of the high requirements on production capacity, which may amount to e.g. 40 m board per minute, the varnish surface impressed between the electron-beam curing steps, is obtained by means of a texturized press plate which preferably is mounted in a cylinder press.

The subject invention offers considerable advantages over the techniques of obtaining surface finishing by means of roller-application of a second varnish layer, such as:

1. Elimination of the adhesion problem between two layers of varnish.

2. Elimination of the restricting factor that roller-application varnishing constitutes at high productional speeds.

3. The pressing technique positively results in a uniform surface texture, and in case a cylinder pressing technique is used, there are no capacity problems.

4. in addition to the fact that a slightly wavy varnish texture has a matting effect on the varnish surface, an adjustable matting effect is achieved through the pressure exerted during the pressing step.

Compared with thin board comprising high-pressure laminate surfaces the subject invention offers the following advantages:

1. The varnished surface creates a design that gives an illustion of depth, which is foreign to high-pressure laminates.

2. Larger amounts of varnish considerably increase the abrasive strength without impairing the effects of the design.

3. The design of the varnish surface in a roller press creates a distinctive surface finish while at the same time favouring production.

4. In contrast to high-pressure laminates, there are no counter-acting problems that may be difficult to handle in thin applications.

5. Considerably lower energy and material costs.

6. The EB-cured varnish is emission-free.

7. Possibility to develop applications that are totally in harmony with the environment.

8. More convenient machining (sawing and milling), resulting in a higher productivity level in the application steps.

The method embraced by the subject invention which concerns the manufacture of board having a decorative character exhibiting impact resistance, resistance to scratches and burns, as well as variable abrasion resistance and variable surface finishing properties (surface texture and gloss), preferably is organized in the following manner:

1. The decorative substrate (upper face consisting of a decorative foil onto which varnish may be applied, and the lower face of a counter-acting backing foil, with due consideration being had to the final amount of varnish) is trimmed along all side edges by removal of projecting foil material and glue rests, is brushed off and vacuum-cleaned.

2. The desired amount of a transparent, EB-curable varnish is applied curtain-fashion. The present scanner capacity is at most 300 g/m$^2$ for a 100% curing. In order to achieve the abrasion strength offered by modern high-pressure laminate flooring, a capacity of barely 100 g/m$^2$ suffices.

3. The varnish is exposed to an EB-curing treatment at a level ensuring the achievement of a curing level of 60–95% (with adaptation to the subsequent pressing operation).

4. The varnished surface is pressed by means of a texturized press plate at a pressure adapted to the degree of curing and to the desired gloss level.

5. The varnish is again EB-cured, this time to a degree ensuring a 100% curing.

When the board does not consist of sheets of material but the varnish is applied directly on the substrate (transparent or pigmented) tests carried out with samples of 6 mm MDF having a weight by volume of 850 kg/m$^3$ have shown that when amounts of varnish of up to 100 g/m$^2$ are used, a manageable convexity in the board is obtained. For higher amounts of varnish it is thus necessary to use either thicker and heavier board or else backing materials have to be put on the rear face.

I claim:

1. A method of manufacturing a finished varnished board using electron beam curing, wherein the finished board has decorative characteristics which exhibit impact and abrasion resistance and variable surface texture and gloss, comprising the steps of:

applying in a curtain fashion at least one layer of varnish to a top surface of a board, and allowing the layer to completely cure;

applying an uppermost varnished layer in said same fashion;

exposing said board to an electron beam scanner set at a scanner capacity of about 100 g/m$^2$ in order to cure said uppermost varnished layer to between 60–95% cured;

providing a cylinder press with a textured pressing plate;

uniformly impressing said uppermost varnished layer with said texturized pressing plate in order to impress a textured design into said uppermost varnished layer;

applying a pressure to said plate at a pressure adapted to a desired degree of surface gloss of said varnished layer and to the degree of curing imputed to said uppermost layer;

re-exposing said uppermost varnished layer to said electron beam scanner in order to cure said varnished layer 100 percent.

2. The method of claim 1, further including an advance step of providing a coextensive, decoratively embossed foil to said top surface of said board before applying the first varnish layer.

3. The method of claim 1, wherein the impact and abrasion resistance characteristics of said board are controlled by the number of varnished layers applied to said board before said uppermost layer is completely cured.

* * * * *

UNITED STATES PATENT AND TRADEMARK OFFICE

CERTIFICATE OF CORRECTION

PATENT NO. : 5,529,812

DATED : June 25, 1996

INVENTOR(S) : Keding

It is certified that error appears in the above-indentified patent and that said Letters Patent is hereby corrected as shown below:

On the title page, item [76] correct the spelling from: Djöm KEDING
to : Bjöm KEDING

Signed and Sealed this

Third Day of September, 1996

Attest:

BRUCE LEHMAN

*Attesting Officer* *Commissioner of Patents and Trademarks*